US008619623B2

(12) United States Patent
Chhabra

(10) Patent No.: US 8,619,623 B2
(45) Date of Patent: Dec. 31, 2013

(54) AD-HOC SIMPLE CONFIGURATION

(75) Inventor: Kapil Chhabra, Sunnyvale, CA (US)

(73) Assignee: Marvell World Trade Ltd. (BB)

( * ) Notice: Subject to any disclaimer, the term of this patent is extended or adjusted under 35 U.S.C. 154(b) by 467 days.

(21) Appl. No.: 11/800,166

(22) Filed: May 4, 2007

(65) Prior Publication Data
US 2008/0037444 A1 Feb. 14, 2008

Related U.S. Application Data

(60) Provisional application No. 60/821,771, filed on Aug. 8, 2006.

(51) Int. Cl.
*H04J 1/16* (2006.01)
(52) U.S. Cl.
USPC .......................................... 370/254; 370/338
(58) Field of Classification Search
USPC ................................................. 370/254, 338
See application file for complete search history.

(56) References Cited

U.S. PATENT DOCUMENTS

| | | | | |
|---|---|---|---|---|
| 4,959,847 | A | * | 9/1990 | Engelke et al. ............... 375/377 |
| 5,488,693 | A | * | 1/1996 | Houck et al. .................. 709/208 |
| 5,738,583 | A | | 4/1998 | Comas et al. |
| 5,850,592 | A | | 12/1998 | Ramanathan |
| 5,877,701 | A | * | 3/1999 | Nagakura .................... 340/7.42 |
| 6,272,120 | B1 | | 8/2001 | Alexander |
| 6,453,181 | B1 | * | 9/2002 | Challa et al. .................. 455/574 |
| 6,524,189 | B1 | | 2/2003 | Rautila |
| 6,600,726 | B1 | | 7/2003 | Nevo et al. |
| 6,662,229 | B2 | | 12/2003 | Passman et al. |
| 6,690,935 | B1 | | 2/2004 | Calot et al. |
| 6,704,866 | B1 | | 3/2004 | Benayoun et al. |
| 6,707,801 | B2 | | 3/2004 | Hsu |
| 6,760,587 | B2 | | 7/2004 | Holtzman et al. |
| 6,785,892 | B1 | | 8/2004 | Miller et al. |
| 6,788,675 | B1 | | 9/2004 | Yang |
| 6,793,580 | B2 | | 9/2004 | Sinclair et al. |

(Continued)

FOREIGN PATENT DOCUMENTS

| | | |
|---|---|---|
| CN | 1375772 A | 10/2002 |
| CN | 1522503 A | 8/2004 |

(Continued)

OTHER PUBLICATIONS

International Search Report for PCT Application No. PCT/US07/17529, mailed Oct. 1, 2008.

(Continued)

*Primary Examiner* — John Blanton
*Assistant Examiner* — Jay P Patel

(57) ABSTRACT

A protocol governing the operation of an ad-hoc WLAN enables each device in the WLAN to be configured as a registrar and/or an enrollee. Accordingly, each device is configurable to support both the registrar as well as enrollee modes of operations. In response to a time-driven user action, the device may be configured to enter into a registrar mode or an enrollee mode. While in the registrar mode, the device enters into an aggressive beaconing phase by setting its beacon contention window to a relatively very small value. The aggressive beaconing increases the probability of the discovery of the registrar by the enrollees. Optionally the device may prompt the user to select between a registrar and an enrollee mode of operation by displaying the option on an LCD panel.

44 Claims, 8 Drawing Sheets

(56) References Cited

U.S. PATENT DOCUMENTS

| | | | |
|---|---|---|---|
| 6,795,701 B1 | 9/2004 | Baker et al. | |
| 6,799,056 B2 | 9/2004 | Curley et al. | |
| 6,859,460 B1 | 2/2005 | Chen | |
| 6,879,570 B1 | 4/2005 | Choi | |
| 6,879,574 B2 | 4/2005 | Naghian et al. | |
| 6,879,812 B2 | 4/2005 | Agrawal et al. | |
| 6,909,705 B1 | 6/2005 | Lee et al. | |
| 6,932,698 B2 | 8/2005 | Sprogis | |
| 6,975,613 B1* | 12/2005 | Johansson | 370/338 |
| 6,980,522 B2* | 12/2005 | Boyle | 370/252 |
| 7,013,391 B2 | 3/2006 | Herle et al. | |
| 7,072,323 B2 | 7/2006 | Roberts et al. | |
| 7,073,129 B1 | 7/2006 | Robarts et al. | |
| 7,095,732 B1 | 8/2006 | Watson, Jr. | |
| 7,097,562 B2 | 8/2006 | Gagner | |
| 7,110,366 B2* | 9/2006 | Hulyalkar et al. | 370/252 |
| 7,120,129 B2 | 10/2006 | Ayyagari et al. | |
| 7,120,456 B1* | 10/2006 | Elliot et al. | 455/517 |
| 7,158,798 B2 | 1/2007 | Lee et al. | |
| 7,181,544 B2 | 2/2007 | Vangal et al. | |
| 7,190,961 B2 | 3/2007 | Burr | |
| 7,224,964 B2 | 5/2007 | Souissi et al. | |
| 7,236,772 B1 | 6/2007 | Botzas | |
| 7,251,235 B2 | 7/2007 | Wentink | |
| 7,257,721 B2* | 8/2007 | Chung et al. | 713/300 |
| 7,324,444 B1 | 1/2008 | Liang et al. | |
| 7,347,781 B2 | 3/2008 | Schultz | |
| 7,400,722 B2 | 7/2008 | Qi et al. | |
| 7,435,179 B1 | 10/2008 | Ford | |
| 7,440,430 B1 | 10/2008 | Jagadeesan et al. | |
| 7,452,278 B2 | 11/2008 | Chen et al. | |
| 7,457,271 B2 | 11/2008 | Donovan | |
| 7,496,065 B2* | 2/2009 | Anjum et al. | 370/328 |
| 7,505,795 B1 | 3/2009 | Lim et al. | |
| 7,515,897 B2* | 4/2009 | Suzuki | 455/343.2 |
| 7,616,588 B2 | 11/2009 | Gatta et al. | |
| 7,729,661 B2 | 6/2010 | Tanaka et al. | |
| 7,733,861 B2 | 6/2010 | Suga | |
| 7,899,017 B2 | 3/2011 | Yu et al. | |
| 7,978,647 B2* | 7/2011 | Anjum et al. | 370/328 |
| 7,990,903 B2 | 8/2011 | Nishihara et al. | |
| 8,073,923 B2 | 12/2011 | Sasaki et al. | |
| 8,180,363 B2 | 5/2012 | Maekawa et al. | |
| 8,321,587 B2 | 11/2012 | Burr | |
| 2001/0055950 A1 | 12/2001 | Davies et al. | |
| 2002/0013784 A1* | 1/2002 | Swanson | 707/104.1 |
| 2002/0061743 A1 | 5/2002 | Hutcheson et al. | |
| 2002/0091790 A1* | 7/2002 | Cubley | 709/217 |
| 2002/0103019 A1 | 8/2002 | Emmerson | |
| 2002/0107985 A1* | 8/2002 | Hwang et al. | 709/246 |
| 2002/0147044 A1 | 10/2002 | Jakobsson et al. | |
| 2002/0151366 A1 | 10/2002 | Walker et al. | |
| 2002/0159401 A1* | 10/2002 | Boger | 370/294 |
| 2002/0176366 A1 | 11/2002 | Ayyagari et al. | |
| 2002/0191560 A1 | 12/2002 | Chen et al. | |
| 2002/0191573 A1 | 12/2002 | Whitehill et al. | |
| 2002/0199124 A1 | 12/2002 | Adkisson | |
| 2003/0023761 A1 | 1/2003 | Jeansonne et al. | |
| 2003/0041150 A1* | 2/2003 | Passman et al. | 709/227 |
| 2003/0069018 A1 | 4/2003 | Matta et al. | |
| 2003/0078062 A1 | 4/2003 | Burr | |
| 2003/0084337 A1* | 5/2003 | Simionescu et al. | 713/200 |
| 2003/0099212 A1* | 5/2003 | Anjum et al. | 370/328 |
| 2003/0163579 A1 | 8/2003 | Knauerhase et al. | |
| 2003/0182454 A1 | 9/2003 | Huth et al. | |
| 2003/0224855 A1 | 12/2003 | Cunningham | |
| 2003/0231189 A1 | 12/2003 | Williams | |
| 2003/0231625 A1 | 12/2003 | Calvignac et al. | |
| 2004/0066751 A1 | 4/2004 | Tseng et al. | |
| 2004/0081110 A1* | 4/2004 | Koskimies | 370/315 |
| 2004/0082383 A1 | 4/2004 | Muncaster et al. | |
| 2004/0105415 A1 | 6/2004 | Fujiwara et al. | |
| 2004/0110563 A1 | 6/2004 | Tanaka et al. | |
| 2004/0127277 A1 | 7/2004 | Walker et al. | |
| 2004/0127289 A1 | 7/2004 | Davis et al. | |
| 2004/0139159 A1 | 7/2004 | Ricciardi et al. | |
| 2004/0146022 A1 | 7/2004 | Lewis et al. | |
| 2004/0174829 A1 | 9/2004 | Ayyagari | |
| 2004/0185851 A1 | 9/2004 | Nagai | |
| 2004/0196808 A1 | 10/2004 | Chaskar et al. | |
| 2004/0259542 A1* | 12/2004 | Viitamaki et al. | 455/426.2 |
| 2005/0032577 A1 | 2/2005 | Blackburn et al. | |
| 2005/0041660 A1 | 2/2005 | Pennec et al. | |
| 2005/0073980 A1 | 4/2005 | Thomson et al. | |
| 2005/0088980 A1 | 4/2005 | Olkkonen et al. | |
| 2005/0099977 A1 | 5/2005 | Williams et al. | |
| 2005/0122940 A1 | 6/2005 | Nian | |
| 2005/0129055 A1 | 6/2005 | Hall et al. | |
| 2005/0138462 A1* | 6/2005 | Hunt et al. | 714/4 |
| 2005/0157661 A1 | 7/2005 | Cho | |
| 2005/0177639 A1 | 8/2005 | Reunamaki et al. | |
| 2005/0181872 A1 | 8/2005 | Acharya et al. | |
| 2005/0197189 A1 | 9/2005 | Schultz | |
| 2005/0221897 A1 | 10/2005 | Oe | |
| 2005/0250487 A1 | 11/2005 | Miwa et al. | |
| 2005/0250497 A1 | 11/2005 | Ghosh et al. | |
| 2005/0268003 A1 | 12/2005 | Wang et al. | |
| 2005/0268151 A1* | 12/2005 | Hunt et al. | 714/4 |
| 2005/0286456 A1 | 12/2005 | McNew et al. | |
| 2005/0286464 A1 | 12/2005 | Saadawi et al. | |
| 2005/0286480 A1 | 12/2005 | Akiyama | |
| 2006/0013160 A1 | 1/2006 | Haartsen | |
| 2006/0041750 A1 | 2/2006 | Carter et al. | |
| 2006/0045138 A1 | 3/2006 | Black et al. | |
| 2006/0046709 A1 | 3/2006 | Krumm et al. | |
| 2006/0056378 A1* | 3/2006 | Sugaya | 370/347 |
| 2006/0062220 A1 | 3/2006 | Suga | |
| 2006/0095290 A1 | 5/2006 | Chernev | |
| 2006/0106963 A1 | 5/2006 | Sasaki et al. | |
| 2006/0135261 A1 | 6/2006 | Kinne et al. | |
| 2006/0135262 A1 | 6/2006 | Kennedy et al. | |
| 2006/0154710 A1 | 7/2006 | Serafat | |
| 2006/0166740 A1 | 7/2006 | Sufuentes | |
| 2006/0179322 A1* | 8/2006 | Bennett et al. | 713/182 |
| 2006/0205409 A1 | 9/2006 | Chiou et al. | |
| 2006/0221858 A1 | 10/2006 | Switzer et al. | |
| 2006/0221915 A1 | 10/2006 | Gatta et al. | |
| 2006/0246947 A1* | 11/2006 | Fujii et al. | 455/557 |
| 2006/0251004 A1* | 11/2006 | Zhong et al. | 370/318 |
| 2006/0259632 A1 | 11/2006 | Crawford et al. | |
| 2006/0282541 A1* | 12/2006 | Hiroki | 709/228 |
| 2007/0030116 A1 | 2/2007 | Feher | |
| 2007/0030824 A1 | 2/2007 | Ribaudo et al. | |
| 2007/0047547 A1 | 3/2007 | Conner et al. | |
| 2007/0060355 A1 | 3/2007 | Amaitis et al. | |
| 2007/0060358 A1 | 3/2007 | Amaitis et al. | |
| 2007/0086394 A1 | 4/2007 | Yamada et al. | |
| 2007/0086424 A1 | 4/2007 | Calcev et al. | |
| 2007/0099703 A1 | 5/2007 | Terebilo | |
| 2007/0105548 A1* | 5/2007 | Mohan et al. | 455/426.1 |
| 2007/0141988 A1 | 6/2007 | Kuehnel et al. | |
| 2007/0155505 A1 | 7/2007 | Huomo | |
| 2007/0190494 A1 | 8/2007 | Rosenberg | |
| 2007/0202890 A1 | 8/2007 | Feher | |
| 2007/0202910 A1 | 8/2007 | Brewer et al. | |
| 2007/0265018 A1 | 11/2007 | Feher | |
| 2007/0291761 A1 | 12/2007 | Kauniskangas et al. | |
| 2008/0013487 A1* | 1/2008 | Molteni et al. | 370/329 |
| 2008/0019522 A1 | 1/2008 | Proctor | |
| 2008/0037444 A1 | 2/2008 | Chhabra | |
| 2008/0037495 A1* | 2/2008 | Anjum et al. | 370/338 |
| 2008/0039015 A1 | 2/2008 | Nakata et al. | |
| 2008/0043868 A1 | 2/2008 | Feher | |
| 2008/0069105 A1 | 3/2008 | Costa et al. | |
| 2008/0095112 A1 | 4/2008 | Wiemann et al. | |
| 2008/0096662 A1 | 4/2008 | Kuwahara et al. | |
| 2008/0108437 A1 | 5/2008 | Kaarela et al. | |
| 2008/0146337 A1 | 6/2008 | Halonen et al. | |
| 2008/0146343 A1 | 6/2008 | Sullivan et al. | |
| 2008/0164984 A1* | 7/2008 | Sheffer | 340/426.13 |
| 2008/0167865 A1* | 7/2008 | Yamanashi et al. | 704/226 |
| 2008/0172491 A1 | 7/2008 | Chhabra et al. | |
| 2008/0220878 A1 | 9/2008 | Michaelis | |
| 2009/0011834 A1 | 1/2009 | Chhabra | |

(56) References Cited

U.S. PATENT DOCUMENTS

| | | | |
|---|---|---|---|
| 2009/0048024 A1 | 2/2009 | Tanaka et al. | |
| 2009/0180441 A1* | 7/2009 | Ikeda | 370/331 |
| 2009/0191878 A1 | 7/2009 | Hedqvist et al. | |
| 2009/0210531 A1* | 8/2009 | Melnikov | 709/226 |
| 2009/0279506 A1 | 11/2009 | Sinnreich et al. | |
| 2010/0087240 A1 | 4/2010 | Egozy et al. | |
| 2010/0278077 A1 | 11/2010 | Reunamaki et al. | |
| 2012/0072485 A1 | 3/2012 | Hutcheson et al. | |
| 2012/0329554 A1 | 12/2012 | Mgrdechian et al. | |

FOREIGN PATENT DOCUMENTS

| | | |
|---|---|---|
| CN | 1842000 A | 10/2006 |
| EP | 1 622 319 A2 | 2/2006 |
| JP | 2004-136009 | 10/2002 |
| JP | 2004-141225 | 10/2002 |
| JP | 2003-289277 | 10/2003 |
| JP | 2004-135778 | 5/2004 |
| JP | 2006-086959 | 9/2004 |
| JP | 2006-050020 | 2/2006 |
| JP | 2006-148448 | 6/2006 |
| JP | 2006-148488 | 6/2006 |
| WO | WO 03/003610 A1 | 1/2003 |
| WO | WO 2004/062198 A1 | 7/2004 |
| WO | WO 2005/076543 | 8/2005 |

OTHER PUBLICATIONS

Written Opinion of the International Searching Authority for PCT Application No. PCT/US07/17529, mailed Oct. 1, 2008.
Chinese Office Action dated Jul. 8, 2010 for Application No. 200780037626.8.
U.S. Appl. No. 11/867,665, filed Oct. 4, 2007, Kopikare.
U.S. Appl. No. 11/924,431, filed Oct. 25, 2007, Kopikare.
U.S. Appl. No. 60/862,898, filed Oct. 25, 2006, Kopikare.
Lortz et al., "Wi-Fi Simple Config Specification", Wi-Fi Alliance Confidential, Version 1.0a, Feb. 10, 2006, pp. 1-107.
Chinese Office Action issued in Chinese Application No. 200780038678.7, dated Sep. 13, 2010.
Notification Concerning Transmittal of International Preliminary Report on Patentability for corresponding PCT Application No. PCT/US2007/080733 mailed Apr. 30, 2009.
International Search Report for corresponding PCT Application No. PCT/US2007/080733 mailed Sep. 9, 2008.
Written Opinion for corresponding PCT Application No. PCT/US2007/08733 mailed Sep. 9, 2008.
Office Action issued in U.S. Appl. No. 11/800,166, mailed Jun. 25, 2009.
Office Action issued in U.S. Appl. No. 11/800,166, mailed Feb. 24, 2010.
Office Action issued in U.S. Appl. No. 11/800,166, mailed Aug. 19, 2010.
Office Action issued in U.S. Appl. No. 11/800,166, mailed Mar. 29, 2011.
Office Action issued in U.S. Appl. No. 11/867,665, mailed Nov. 23, 2010.
IEEE, "Further Higher-Speed Physical Layer Extension in the 2.4 GHz Band", IEEE, Draft Std 802.11 q-2002, New York, NY, May 2002, Downloaded from the Internet (47 pages).
IEEE, "Part 11: Wireless LAN Medium Access Control (MAC) and Physical Layer (PHY) specifications, Amendment 2: Higher-speed Physical Layer (PHY) extension in the 2.4 GHz band", IEEE Std 802.11 b-1999/Cor Jan. 2001, New York, NY, Nov. 7, 2001, Downloaded from the Internet (23 pages).
IEEE, "Part 11: Wireless LAN Medium Access Control (MAC) and Physical Layer (PHY) specifications, Amendment 5: Spectrum and Transmit Power Management Extensions in the 5 GHz band in Europe", IEEE Std 802.11 h-2003, New York, NY, Oct. 14, 2003, Downloaded from the Internet (75 pages).
IEEE, "Part 11: Wireless LAN Medium Access Control (MAC) and Physical Layer (PHY) specifications, Amendment 6: Medium Access Control (MAC) Security Enhancements", IEEE Std 802.11 i-2004, New York, NY, Jul. 23, 2004, Downloaded from the Internet (190 pages).
IEEE, "Part 11: Wireless LAN Medium Access Control (MAC) and Physical Layer (PHY) specifications, Amendment 7: Medium Access Control (MAC) Quality of Service (QoS) Enhancements", IEEE P802.11 e/D11.0, New York, NY, Oct. 2004, Downloaded from the Internet (195 pages).
IEEE, "Part 11: Wireless LAN Medium Access Control (MAC) and Physical Layer (PHY) specifications: Further Higher Data Rate Extension in the 2.4 GHz Band", IEEE P802.11 g/D8.2, New York, NY, Apr. 2003, Downloaded from the Internet (69 pages).
IEEE, "Part 11: Wireless LAN Medium Access Control (MAC) and Physical Layer (PHY) specifications: High-speed Physical Layer in the 5 Ghz Band", IEEE Std 802.11 a-1999, New York, NY, Dec. 30, 1999, Downloaded from the Internet (91 pages).
IEEE, "Part 11: Wireless LAN Medium Access Control (MAC) and Physical Layer (PHY) specifications: Higher-Speed Physical Layer Extension in the 2.4 GHz Band", IEEE Std 802.11 b-1999, New York, NY, Jan. 20, 2000, Downloaded from the Internet (96 pages).
IEEE, "TGn Sync Proposal Technical Specification-Abstract," IEEE 802.11-04/0889r6, Mujtaba, Syed Aon, Agere Systems, Allentown, PA, May 18, 2005, Downloaded from the Internet (131 pages).
Office Action issued in U.S. Appl. No. 11/924,431, mailed Apr. 12, 2011.
IEEE P802. 11g/D8.2, Draft Supplement to Standard [for] Information Technology, Telecommunication and information exchange between systems, Local and metropolitan area networks-Specific requirements, Part 11: Wireless LAN Medium Access Control (MAC) and Physical Layer (PHY) specifications: Further Higher Data Rate Extension in the 2.4 Ghz Band, 69 pgs, Apr. 2003.
Doc.: IEEE 802.11-04/0889r6, IEEE P802.11 Wireless LANs, TGn Sync Proposal Technical Specifications, Sved Aon Muiitaba, Aaere Systems, 131 pgs., May 2005.
IEEE Std. 802.11 a-1999, Supplemental to IEEE Standard for Information technology, Telecommunications and information exchange between systems, Local and metropolitan area networks, Part 11: Wireless LAN Medium Access Control (MAC) and Physical Layer (PHY) specifications: High-speed Physical Layer in the 5 Ghz Band, 91 pp.., Sep. 16, 1999.
Office Action issued in U.S. Appl. No. 11/867,661, mailed Sep. 15, 2009.
Office Action issued in U.S. Appl. No. 11/867,661, mailed Mar. 26, 2010.
Office Action issued in U.S. Appl. No. 11/867,661, mailed Jun. 11, 2010.
Office Action issued in U.S. Appl. No. 11/867,661 mailed Nov. 1, 2010.
Notice of Allowance issued in U.S. Appl. No. 11/867,665, mailed Feb. 28, 2011.
IEEE Std. 802.11b-1999, Supplement to IEEE Standard for information technology, Telecommunication and information exchange between systems, Part 11: Wireless LAN Medium Access Control (MAC) and Physical Layer (PHY) specifications: Higher-Speed Physical Layer Extension in the 2.4 GHz Band, 96 pgs., Sep. 16, 1999.
Chinese Office Action issued in Chinese Application No. 200780038678.7, dated Oct. 18, 2011.
Hirano Aya, "Introductory Techniques for Current Wireless LAN," Nikkei network vol. 67, Japan Nikkei BP, Nikkei Business Publications, Inc., 2005, (see also English translation of Summary of Japanese Office Action dated Nov. 29, 2011).
Japanese Office Action dated Nov. 29, 2011 for Japanese Patent Application No. 2009523819, including English translation of Summary of Japanese Office Action.
Japanese Office Action dated Feb. 7, 2012 for Japanese Patent Application No. 2009-532521, including English translation of Summary of Japanese Office Action.
Japanese Office Action mailed Sep. 18, 2012 for Japanese Patent Application No. 2009-532521, including English translation of Summary of Japanese Office Action.

(56) References Cited

OTHER PUBLICATIONS

Japanese Office Action mailed Feb. 4, 2013 for Japanese Patent Application No. 2009-532521, including English translation of Summary of Japanese Office Action.
U.S. Appl. No. 11/867,665, "Power Save Mechanisms for Dynamic Ad-Hoc Networks," Kopikare et al., filed Oct. 4, 2007, 43 pages.
U.S. Appl. No. 11/867,661, "Automatic Ad-Hoc Network Creation and Coalescing Using WPS," Chhabra et al., filed Oct. 4, 2007, 24 pages.
U.S. Appl. No. 11/924,431, "System and Method for Gaming in an Ad-Hoc Network," Kopikare et al., filed Oct. 25, 2007, 32 pages.
U.S. Appl. No. 12/167,804, "Location Aware Ad-Hoc Gaming," Kapil Chhabra, filed July 3, 2008, 22 pages.
International Search Report for corresponding PCT Application No. PCT/US2008/069185, mailed Sep. 3, 2008, 1 page.
Written Opinion for corresponding PCT Application No. PCT/US2008/069185, mailed Sep. 3, 2008, 1 page.
Office Action issued in U.S. Appl. No. 11/542,393, mailed Nov. 9, 2009, 28 pages.
Office Action issued in U.S. Appl. No. 11/542,393, mailed Apr. 9, 2013, 30 pages.
Office Action issued in U.S. Appl. No. 11/542,393, mailed Aug. 5, 2010, 45 pages.
Office Action issued in U.S. Appl. No. 11/542,393, mailed Apr. 13, 2011, 98 pages.
Office Action issused in U.S. Appl. No. 12/167,804, mailed Sep. 2, 2011, 8 pages.
Notice of Allowance issued in U.S. Appl. No. 11/867,665, mailed Sep. 2, 2011, 11 pages.
Office Action issued in U.S. Appl. No. 11/924,431, mailed Oct. 17, 2011, 14 pages.
Office Action issued in U.S. Appl. No. 12/167,804, mailed Dec. 22, 2011, 14 pages.
Notice of Allowance issued in U.S. Appl. No. 11/867,665, mailed Feb. 10, 2012, 11 pages.
Third Office Action issued in Chinese Application No. 200780038678.7, dated Apr. 28, 2012, 2 pages, English language translation.
Notice of Allowance issued in U.S. Appl. No. 11/542,393, mailed May 14, 2012, 45 pages.
Office Action issued in U.S. Appl. No. 12/167,804, mailed May 23, 2012, 15 pages.
Office Action issued in U.S. Appl. No. 11/867,661, mailed Sep. 5, 2012, 33 pages.
Notice of Allowance issued in U.S. Appl. No. 12/167,804, mailed Sep. 26, 2012, 16 pages.
Office Action issued in U.S. Appl. No. 11/924,431, mailed Nov. 26, 2012, 27 pages.
Office Action issued in U.S. Appl. No. 11/867,661, mailed Mar. 11, 2013, 16 pages.
Notice of Allowance issued in U.S. Appl. No. 12/167,804, mailed Mar. 19, 2013, 15 pages.
Lety, Emmanuel et al., "MiMaze, a 3D Multi-Player Game on the Internet," *Proc. of the 4th International Conference of VSMM (Virtual Systems and MultiMedia)*, Gifu, Japan, 1998, 6 pages.

\* cited by examiner

AD-HOC SIMPLE CONFIGURATION

CROSS-REFERENCES TO RELATED APPLICATIONS

The present application claims benefit under 35 USC 119 (e) of U.S. provisional application No. 60/821,771, filed Aug. 8, 2006, entitled "WiFi Simple Config Design", the content of which is incorporated herein by reference in its entirety.

BACKGROUND OF THE INVENTION

The present invention relates to wireless communication networks, and more particularly to a protocol for establishing an ad-hoc wireless fidelity network.

Wireless fidelity (WiFi) networks are well known and are being increasingly used to exchange data. One known WiFi standard, commonly referred to as WiFi Protected Setup (WPS) or WiFi Simple Configuration (WSC), is a Wireless Local Area Network (WLAN) standard that defines the communication modes and the associated configuration protocols for an infrastructure WLAN.

There are three logical components in an infrastructure WSC network, namely a registrar, an access point (AP) and an enrollee. Referring to FIG. 1A, to establish a wireless communications link with legacy AP 10, WSC client 12 first seeks to acquire network credentials from external registrar 14 using an 802.11 ad-hoc network. Subsequently, WSC client 12 establishes a link to legacy AP 10 using the network credentials that WSC client 12 has acquired from external registrar 14.

Referring to FIG. 1B, AP 20 is shown as having an embedded registrar. To establish a communications link with AP 20, WSC client 22 first seeks to acquire network credentials from AP 20's embedded registrar over an 802.11 infrastructure network. Subsequently, using the acquired network credentials, WSC client 22 wirelessly connects to AP 20.

Referring to FIG. 1C, to establish a communications link with WSC AP 30, WSC client 32 first seeks to acquire network credentials using an extended authentication protocol (EAP) via WSC AP 30. WSC AP 30 relays the WSC client 32's EAP message to registrar 34 using a Universal Plug and Play (UpnP) protocol. Next, using the acquired network credentials supplied by registrar 34, WSC client 32 establishes a communications link with WSC AP 30. WSC and its communication protocols are described, for example, in Wi-Fi Simple Configuration Specification, Version 1.0a, Feb. 10, 2006, by Wi-Fi Simple Configuration Working Group in the Wi-Fi Alliance.

As electronic devices with wireless network capabilities become more pervasive, it would be desirable to enable two or more of such devices to form an ad-hoc wireless network to exchange data without using an access point.

BRIEF SUMMARY

In accordance with the present invention, a method of forming a wireless ad-hoc network includes triggering an event in response to a first action. The device is configured in a first mode if a second action is taken within a predefined time period of the first action. The device is configured in a second mode if the second action is not taken within the predefined time period of the first action. In one embodiment, the first mode is an enrollee mode and the second mode is a registrar mode. In another embodiment, the first mode is a registrar mode and the second mode is an enrollee mode. The second action may be represented by the pressing of a button on the device. If the device is configured as a registrar, its beacon contention window is set to a very small value either periodically or in response to a button press. Subsequently, the registrar starts to transmit beacons in accordance with the value of its reduced beacon contention window.

The method further includes starting a timer on the configured registrar, initiating an attempt to perform a registrar-enrollee handshake if a probe request transmitted by an enrollee is received by the registrar before the timer reaches a predefined time, and establishing an ad-hoc network with the enrollee if the attempt is successful. In one embodiment, N more enrollees may be added to the ad-hoc network, wherein N is a predefined integer greater than 1. In one embodiment, if the registrar fails to receive an enrollee probe request before the timer reaches the predefined time, the registrar is placed in an idle mode. The registrar may exit the idle mode periodically for aggressive beaconing and using a reduced beacon contention window, in accordance with a first clock period. Furthermore, the scanning period of an enrollee may be set equal to the period of the first clock.

In some embodiments, the beacon contention window of the registrar continues to be reduced so long as the registrar receives beacons from other registrars. In yet other embodiments, the registrar will not register an enrollee unless the registrar receives a PIN associated with the enrollee seeking to communicate with the registrar. The PIN entry may be performed using an optical signal, an audio signal, an RF signal, or manually by a user.

If the device is configured as an enrollee, a timer is started and the enrollee starts to scan for beacons transmitted by a registrar. If the enrollee receives a beacon from a registrar before the timer's time reaches a predefined time, the enrollee initiates an extended authentication protocol exchange with the registrar. After the completion of the exchange of the extended authentication protocol, an attempt is made to perform a registrar-enrollee handshake. If the attempt is successful, an ad-hoc network is established, otherwise the timer is reset.

In some embodiments, the enrollee is placed in an idle mode after it joins the ad-hoc network. In some embodiments, a registrar application is started on the enrollee after the ad-hoc network is established.

In accordance with another embodiment of the present invention, a method of selecting a configuration mode of a device in an ad-hoc network includes in part, triggering an event in response to a first action, presenting an option to configure the device as a registrar or an enrollee, configuring the device as an enrollee if the first option is selected, and configuring the device as a registrar if the second option is selected. In some embodiments, the first and second options are presented via a display, such as an LCD panel.

In accordance with another embodiment of the present invention, a device capable of wireless communication includes means for triggering an event in response to a first action, means for configuring the device in a first mode if a second action is taken within a predefined time of the first action, and means for configuring the device in a second mode if the second action is not taken within the predefined time of the first action. In one embodiment, the first mode is an enrollee mode and the second mode is a registrar mode. In another embodiment, the first mode is a registrar mode and the second mode is an enrollee mode. The second action may be represented by the pressing of a button on the device. The device further includes means for setting the beacon contention window of the registrar to a very small value, and means for starting to transmit beacons in accordance with the reduced beacon contention window.

The configured registrar further includes means for measuring time, means for initiating an attempt to perform a registrar-enrollee handshake if a probe request transmitted by an enrollee is received by the registrar before the time measured by the time measuring means reaches a predefined time, and means for establishing an ad-hoc network with the enrollee if the attempt is successful. The registrar further includes means for adding N more enrollees to the ad-hoc network, wherein N is a predefined integer greater than 1. The registrar further includes means for placing the registrar in an idle mode if the registrar fails to receive an enrollee probe request before the measured time reaches the predefined value. The registrar further includes means for forcing the registrar out of the idle mode periodically in accordance with a first clock period. Furthermore, the scanning period of an enrollee may be set equal to the period of the first clock.

Some embodiments further include means to continuously reduce the beacon contention window of the registrar so long as the registrar receives beacons from other registrars. In some embodiments, the registrar includes means for receiving a PIN associated with an enrollee via an optical signal, an audio signal, or a manual entry by a user.

The configured enrollee further includes means for measuring time and means for scanning for beacons from a registrar. If the scanning means receives a beacon from a registrar before the time measured by the time measuring means reaches a predefined time, an initiating means initiates an extended authentication protocol exchange with a registrar. The enrollee further includes means for initiating an attempt to perform a registrar-enrollee handshake following the completion of the exchange of the extended authentication protocol. If the attempt is successful, the enrollee may establish communication over a WiFi ad-hoc network using the credentials obtained from the registrar, otherwise the timer is reset.

The enrollee further includes means for placing the enrollee in an idle mode after it joins the ad-hoc network. The enrollee further includes means for starting a registrar application on the enrollee after the ad-hoc network is established.

In accordance with one embodiment of the present invention, a device adapted to participate in a wireless ad-hoc network session includes, in part, a triggering circuit configured to trigger an event in response to a first action; a first timer; and a controller operative to configure the device in a first mode if the triggering block detects a second before the first timer reaches a known time, and to configure the device in a second mode if the triggering block does not detect a second action before the first timer reaches the known time. In one embodiment, the first mode is an enrollee mode and the second mode is a registrar mode. In another embodiment, the first mode is a registrar mode and the second mode is an enrollee mode. The second action may be represented by the pressing of a button on the device. The controller sets the beacon contention window of the device to a relatively small value if the device is configured as a registrar. Thereafter, the device transmits beacons in accordance with the reduced beacon contention window.

The configured registrar further includes, in part, a second timer. The controller performs a registrar-enrollee handshake if a probe request transmitted by an enrollee is received before the second timer reaches a predefined time. If the handshake is successful, the second timer is reset. In some embodiments, the controller places the registrar in an idle mode if the registrar fails to receive an enrollee probe request before the second timer reaches the predefined time. In some embodiments, the controller attempts to add N more enrollees to the established ad-hoc network, wherein N is a predefined integer greater than one.

In some embodiments, the controller causes the registrar to exit the idle mode periodically for aggressive beaconing using a reduced contention window, in accordance with a first clock period. In yet other embodiments, the controller continues to reduce the beacon contention window while the registrar receives beacons from other registrars. In some embodiments, the registrar includes an interface for receiving a PIN associated with an enrollee seeking to communicate with the registrar. The PIN may be received via an optical signal, an audio signal or a manual user entry.

A configured enrollee further includes, in part, a second timer, and a scanner adapted to scan for beacons transmitted by one or more registrars. The controller initiates an extended authentication protocol exchange if the enrollee receives a beacon from a registrar before the second timer reaches a predefined value. The controller attempts to perform a registrar-enrollee handshake after the completion of the exchange of the extended authentication protocol. If the attempt is successful, the controller uses the network credentials obtained from the registrar to establish communication over a Wi-Fi ad-hoc network. If the attempt is unsuccessful, the second timer is reset.

In some embodiments, the controller places the enrollee in an idle mode after the enrollee joins the ad-hoc network. In some embodiments, the controller causes a registrar application to start on the enrollee after the ad-hoc network is established.

In accordance with another embodiment of the present invention, a device adapted to participate in a wireless ad-hoc network session, includes, in part, a triggering block configured to trigger an event in response to a first action; a display panel presenting an option to configure the device as a registrar or an enrollee; and a controller operative to configure the device as an enrollee in response to a first selected option, and to configure the device as a registrar in response to a second selected option.

DETAILED DESCRIPTION OF THE PRESENTLY PREFERRED EMBODIMENTS

In accordance with one embodiment of the present invention, an ad-hoc WLAN is established between two or more devices, such as Personal Digital Assistants (PDAs), digital cameras, phones, video game consoles, etc. In conformity with a protocol governing the operation of the ad-hoc WLAN (hereinafter alternatively referred to as an ad-hoc network) of the present invention, each device in the network can be a registrar as well as an enrollee (client). In other words, in accordance with the present invention, each device is configurable to support both the registrar mode as well as the enrollee mode of operations.

In response to a user action, such as the pressing of a button or entering a soft/hard key, the device may be configured to enter into a registrar mode or an enrollee mode. While in the registrar mode, in response to either user action, such as a user button press, or otherwise periodically, the device enters into an aggressive beaconing mode by setting its beacon contention window to a relatively very small value. The aggressive beaconing increases the probability of the discovery of the registrar by the enrollees. Although the following description is made with reference to an ad-hoc WSC (WPS) network, it is understood that the present invention applies to any other ad-hoc network, WSC or otherwise.

Figure 1A:
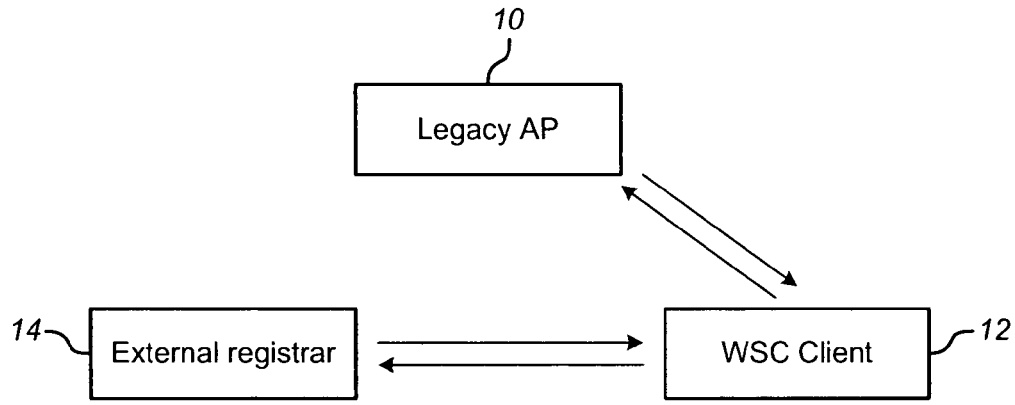
FIG. 1A-1C show various logical components of infrastructure of wireless networks, as known in the prior art.
Figure 1B:
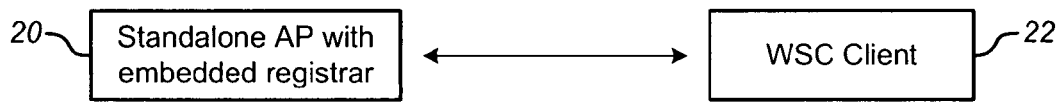
Figure 1C:
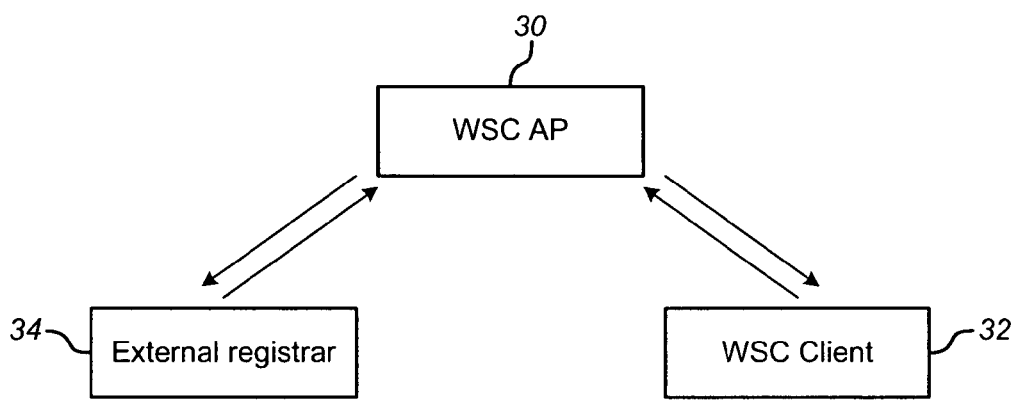
Figure 2:
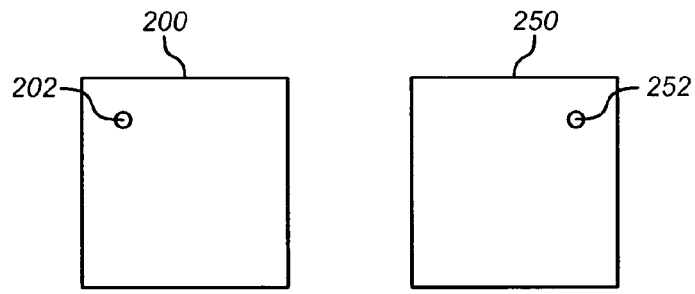
FIG. 2 shows a pair of devices to be configured to establish an ad-hoc network, in accordance with one embodiment of the present invention.

FIG. 2 shows a pair of devices 200, 250 that are configured to establish or join an ad-hoc network to exchange data, in accordance with one embodiment of the present invention. Assume that each of devices 200 and 250 is initially in an Idle (also referred to herein as power-save) mode to reduce battery consumption or is otherwise turned off. In response to a user triggered event, such as the pressing of a hard/soft button on these devices, e.g., button 202 on device 200 and button 252 on device 250, these devices exit the Idle mode or are otherwise turned on. In one embodiment, if within a predetermine time period, e.g., 5 seconds, of exiting the power-save mode, button 202 (or 252) is pressed again, device 200 (250) is configured as an enrollee, i.e., assumes the role of an enrollee, otherwise device 200 (250) is configured as a registrar, i.e., assumes the role of a registrar. In another embodiment, if within a predetermined time period, e.g., 5 seconds, of exiting the power-save mode, button 202 (252) is pressed again, device 200 (250) assumes the role of a registrar, otherwise device 200 (250) assumes the role of an enrollee. To establish an ad-hoc network between these two devices, one of them is configured as a registrar and the other one is configured as an enrollee. Assume that device 200 is configured as a registrar and device 250 is configured as an enrollee. Once registrar 200 is discovered by enrollee 250 and enrollee 250 completes its registration with registrar 200, enrollee 250 uses the network credentials obtained from registrar 200 to establish communication over a Wi-Fi ad-hoc network to enable exchange of data.

In the embodiment shown in FIG. 2, the same keys or buttons that are used to cause devices 200 and 250 to exit their respective power-save modes, are also used to determine whether the devices assume the role of an enrollee or a registrar. In other embodiments, the key used to force a device out of the power-save mode may be different from the one used to select the configuration of the device as a registrar or an enrollee. Once a device is configured as a registrar, to become an enrollee, the device is turned off and turned back on. In some embodiments, if a registrar does not detect an enrollee within a known time period, the registrar goes back into a power save mode. Moreover, in some embodiments, in response to a single user-triggered action, a multitude of enrollees may join the ad-hoc network after registering with the registrar.

In some embodiments, after the device is caused to exit the power-save mode in response to a user triggered event, the user is presented with an option of selecting between a registrar mode and an enrollee mode of configuration via a user interface disposed on the device. For example, if the device is equipped with a user interface, e.g., a Liquid Crystal Display (LCD) panel, the user is prompted on the LCD panel with an option of selecting between a registrar mode and an enrollee mode of configuration. By moving a cursor to one of the displayed entries, the user selects the desired mode of operation. In a similar manner, the enrollee is also configured to wake-up from the power save mode to look for a registrar.

Figure 3:
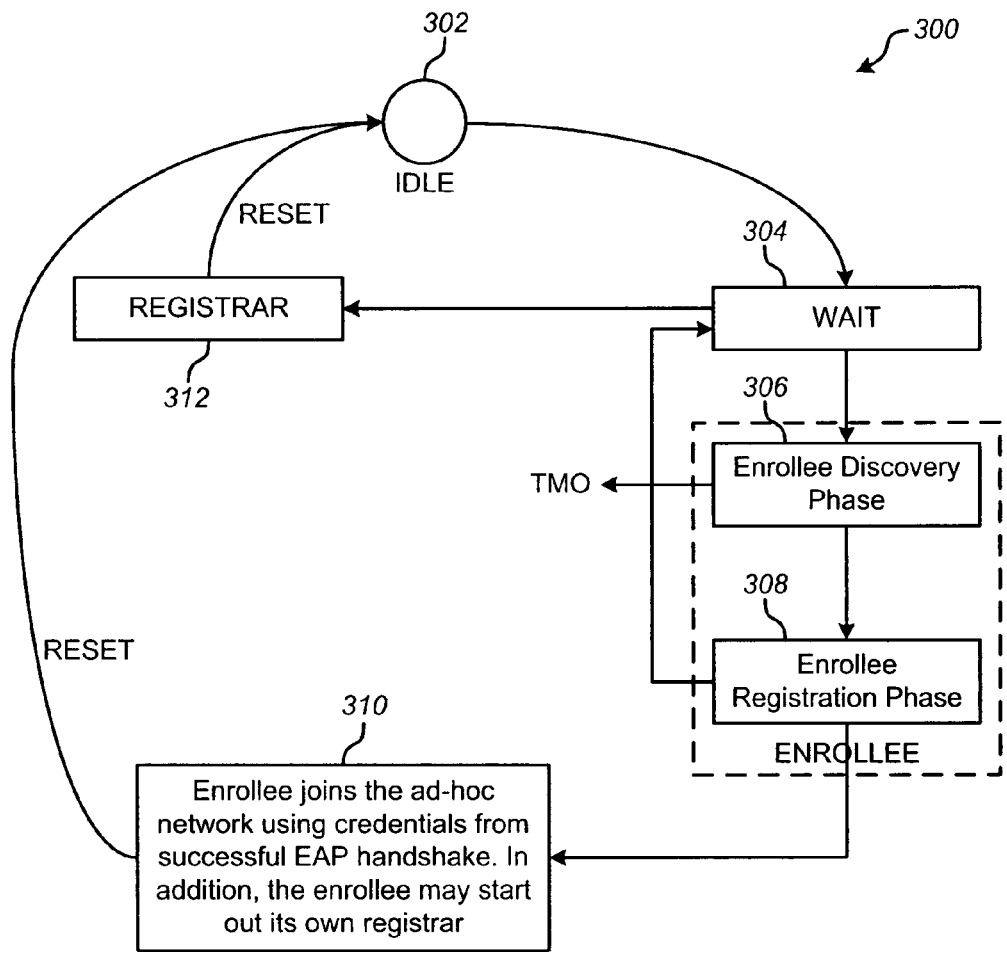
FIG. 3 is an exemplary state transition table associated with establishing a node's configuration status, in accordance with one embodiment of the present invention

FIG. 3 is an exemplary state transition table 300 associated with establishing the configuration status of a device following an exit from a power-save mode, in accordance with one embodiment of the present invention. The device remains in Idle state 302 while in power-save mode. After exiting the power-save mode, a Wi-Fi module disposed in the device is activated and a transition to Wait state 304 is made. While in Wait state 304, if within a predetermined time period the user triggers an event, such as by pressing a hard/soft key or issuing a voice command, the device is configured as, i.e., assumes the role of, an enrollee and enters the enrollee discovery phase (state) 306 to scan for a registrar. If, on the other hand, the predetermined time period expires without a user-triggered event, a transition to state 312 is made and the device is configured as a registrar to start its own ad-hoc network. The registrar transitions back to Idle mode 302 in response to a Reset signal.

If the enrollee discovers a registrar while in state 306, it transitions to enrollee registration phase 308 to start the registration process with the registrar. If, on the other hand, the enrollee does not discover a registrar while in state 306, the enrollee issues a timeout signal TMO. The enrollee may be configured to attempt to discover the registrar a predefined number of times before issuing the time out signal. If the attempt to discover the registrar is unsuccessful after the predefined number of attempts, the enrollee may create its own ad-hoc network and start a registrar application.

If the enrollee registration is successful in state 308, the enrollee transitions to state 310 and attempts to join the ad-hoc network using the credentials the enrollee has obtained from its successful extended authentication protocol (EAP) handshake. If, on the other hand, the enrollee registration is unsuccessful while in state 308, the enrollee transitions back to Wait state 304. The enrollee may also start its own registrar application while in state 310. Following the operations in state 310, the enrollee transitions back to Idle state 302 in response to the Reset signal.

In some embodiments of the present invention, to establish a secure mode of connection between an enrollee and a registrar, the user has to enter a PIN associated with the enrollee on the registrar. Upon this entry, the enrollee and registrar proceed to establish a connection. In such embodiments, the beacons transmitted by the registrar to potential enrollees contain information conveying that the registrar communicates via a PIN mode only and that the registrar will not participate in a push-button mode of an ad-hoc network session. In yet other embodiments, the connection between the enrollee and registrar is established using a Secure Push Button Configuration (SPBC) mode in accordance with which the enrollee relays a PIN to the registrar via an optical signal, e.g. LED flashes, an audio signal, e.g., audio beeps, RF signals, etc. In other words, in such embodiments, the enrollee wirelessly transmits the PIN to the registrar, thus dispensing the need for a manual PIN entry by the user.

One challenge in establishing an ad-hoc network is the discovery of the registrar when both extended (e.g., WSC) as well as legacy (non-WSC) devices are present. In order to avoid conflicts with existing standardized communications and devices, extended devices, such as WSC devices, that extend beyond the limits of the 802.11 standard, and legacy devices that comply with the existing standards and are not necessarily aware of extended standards, need to coexist in a common communication space and interoperate at times. Both legacy and extended devices must first be discovered, as described further below.

Figure 4:
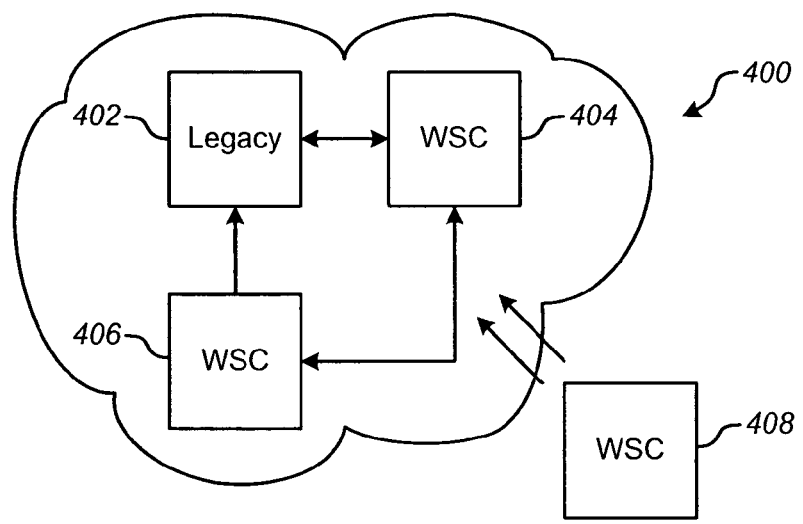
FIG. 4 shows an ad-hoc network that includes both legacy as well as extended devices.

FIG. 4 shows an ad-hoc network 400 that includes a legacy device (alternatively referred to as node) 402, and WSC nodes 404 and 406. To be discovered, at predetermined times, referred to as target beacon transmission times (TBTT), all 3 nodes compete to send out their respective beacons. Each node uses a random back-off, corresponding to the number of time slots the node will delay its beacons relative to TBTTs, to determine its beacon transmission time in accordance with the well known Distributed Coordination Function Rules. In each TBTT, the node with the least random back-off transmits its beacon; the remaining nodes, intercepting the transmitted beacon, refrain from transmitting any beacons during that TBTT. In the next TBTT, the same procedure is repeated where new random back-offs are computed and the node having the least random back-off transmits its beacon. A node with a smaller beacon contention window, in accordance with the present invention, is more likely to have a smaller random back-off than a node with a larger beacon contention window. This beaconing scheme ensures that over N beacons, N/3 beacons are transmitted from each node.

Figure 5:
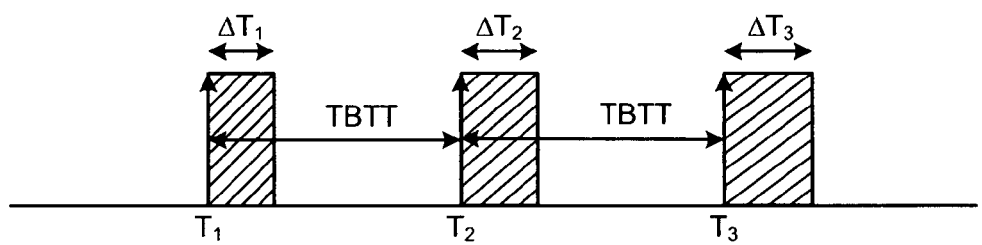
FIG. 5 shows exemplary actual beacon transmission times associated with the network shown in FIG. 4.

FIG. 5 shows exemplary actual beacon transmission times associated with network 400 and computed with reference to TBTTs Times $T_1$, $T_2$, $T_3$, etc. Assume legacy node 402 has the smallest random back-off and WSC node 406 has the largest random back-off. Accordingly, since legacy node 402 has the smallest random back-off, at time $(T_1+\Delta T_1)$ legacy node 402 transmits it beacon. Time period $\Delta T_1$ is defined by the random back-off associated with node 402. Nodes 404 and 406 receiving the beacons from node 402 remain silent and do not transmit their beacons until the next TBTT arrives. In a similar manner, nodes 404 and 406 transmit their beacons at times $(T_2+\Delta T_2)$ and $(T_3+\Delta T_3)$. Time periods $\Delta T_2$ and $\Delta T_3$ are defined by the random back-offs associated with nodes 404 and 406.

As is well known, the beacons transmitted by a legacy node, such as node 402 in network 400, lack the information element signal. In a WSC network, the information element signal is referred to as WPS_IE. Since in an ad-hoc network, beacon generation is a shared responsibility, if the beacon intercepted by an enrollee is the one transmitted by a legacy node, the enrollee will not discover the extended registrar and will report a failure.

Referring to FIG. 4, assume enrollee 408 is attempting to join network 400. Enrollee 408 scans for beacons by sending out a probe request and detecting probe responses or beacons transmitted by any of the registrars in network 400. If the probe response that the enrollee 408 receives does not have a WPS_IE, i.e., the received probe response is the one transmitted by legacy node 402, enrollee 408 reports a failure and abandons further attempts to join network 400. In other words, once the enrollee determines that the network from which the legacy beacons are transmitted does not have the desired extended features, the enrollee decides not to join that network. In one embodiment, following such a decision, the enrollee becomes a registrar and attempts to form its own network.

In accordance with the present invention, to increase the probability that the beacons transmitted by an extended WSC registrar are the first beacons to be received by an enrollee, the beacon contention window of the extended registrar is set to a relatively very small number. In one embodiment, the beacon contention window of the registrar may be set to a value between 0 and 15 time slots. In another embodiment, the beacon contention window of the registrar may be set to a value between 0 and 10 time slots. In yet another embodiment, the beacon contention window of the registrar may be set to a value between 0 and 5 time slots. For example, if the beacon contention window is set to zero, the probability is significantly higher that the beacon received by the enrollee is an extended WSC registrar beacon and not a legacy beacon. This will also increase the probability that as the registrar exits the power-save mode and starts sending out beacons, the registrar is discovered by the enrollee.

Figure 6:
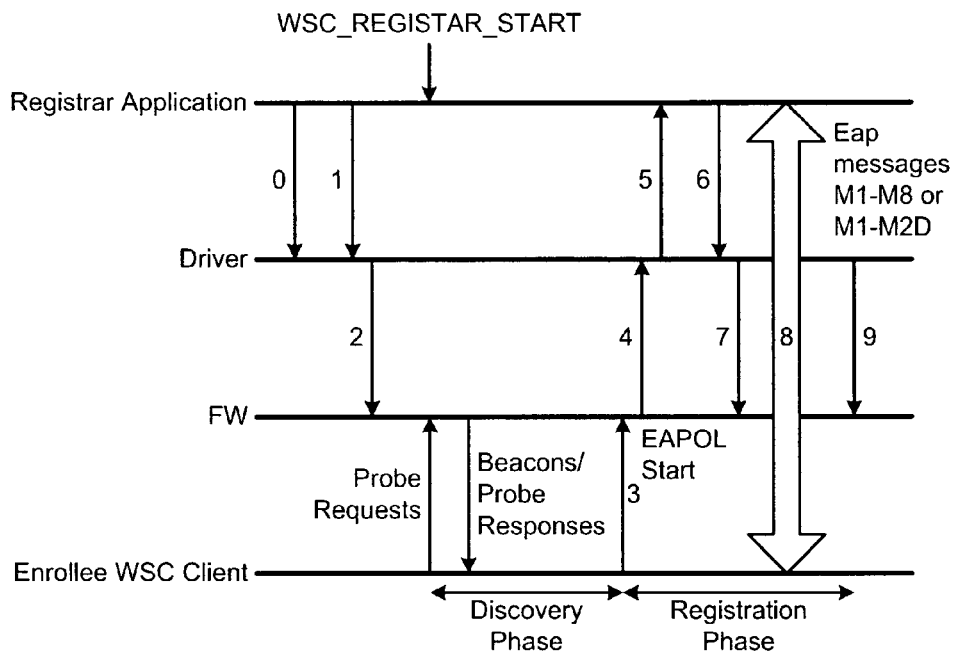
FIG. 6 shows a handshake sequence between an enrollee and a registrar, in accordance with one embodiment of the present invention.

FIG. 6 shows, in part, the handshake sequence between an enrollee and a registrar, in accordance with one embodiment of the present invention. The handshake includes a discovery phase followed by a registration phase. The registration phase of the handshake is similar to that of an infrastructure WSC network, and is described for example, in Wi-Fi Simple Configuration Specification, Version 1.0a, Feb. 10, 2006, by Wi-Fi Simple Configuration Working Group in the Wi-Fi Alliance. The discovery phase is described below with reference to a WSC network.

In response to a button press, or entry of a PIN on the registrar as described above, a signal called WSC_REGISTRAR_START is generated. In response, the registrar application/driver causes signal WSC_IE to be included in the beacons and probe responses of the registrar, shown as event 0. During event 1, the registrar application, e.g. a Linux or a Windows application, designates the start of a registrar session to the driver. This designation may be made in response to a button press, a user command to initiate the registrar enrollment, or a PIN entry on the ad-hoc registrar. During event 2, (i) the driver sends an ad-hoc power-save exit command to the Firmware (FW); and (ii) the ad-hoc registrar is placed in an aggressive beaconing mode. The FW controls WLAN events of the discovery phase. When placed in the aggressive beaconing mode, the beacon contention window of the registrar is set to a relatively very small value in accordance with which beacon/probe responses are transmitted by the registrar, as described above. After successful discovery of the registrar, the enrollee will send an EAP over LAN (EAPOL) frame signal signifying the end of the discovery phase, shown as event 3. Subsequently, the registration phase starts.

As mentioned above, in some embodiments, a WSC start of registrar session causes the registrar to exit the power-save mode and enter the aggressive beaconing mode, subsequent to which the beacon contention of the registrar is made very small relative to those of legacy devices. In yet other embodiments, the FW periodically places the registrar in the aggressive beaconing mode. The enrollee client may also be configured to set its scanning time equal to the periodicity of the registrar beaconing. This periodicity is configurable and represents a trade off between the registrar power savings and the enrollee client scan time.

Figure 7:
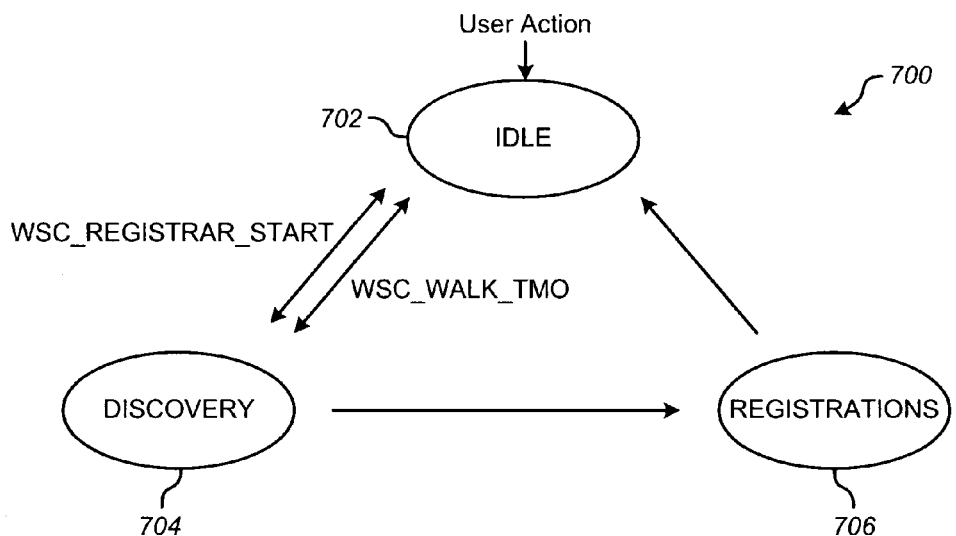
FIG. 7 is an exemplary state transition table associated with a registrar application, in accordance with one embodiment of the present invention.

FIG. 7 is an exemplary state transition table 700 associated with a registrar application, in accordance with one embodiment of the present invention. State transition table 700 is shown as having 3 states, namely Idle state 702, Discovery state 704 and Registrations state 706. The registrar remains in Idle state 702 until the user takes an action, e.g., by pressing a button, entering a PIN, issuing a voice command, etc. In response to the user action, an event WSC_REGISTRAR_START forces a transition from Idle state 702 to Discovery state 704. While in Discovery state 704, if the registrar is not discovered within a predetermined time period WSC_WALK_TMO, a transition back to Idle state 702 occurs. If, on the other hand, the registrar is discovered prior to the expiration of the time period WSC_WALK_TIME, a transition to Registration state 706 is made. After a successful registration or a failure to register, a transition from Registration state 706 to Idle state 702 is made.

Figure 8:
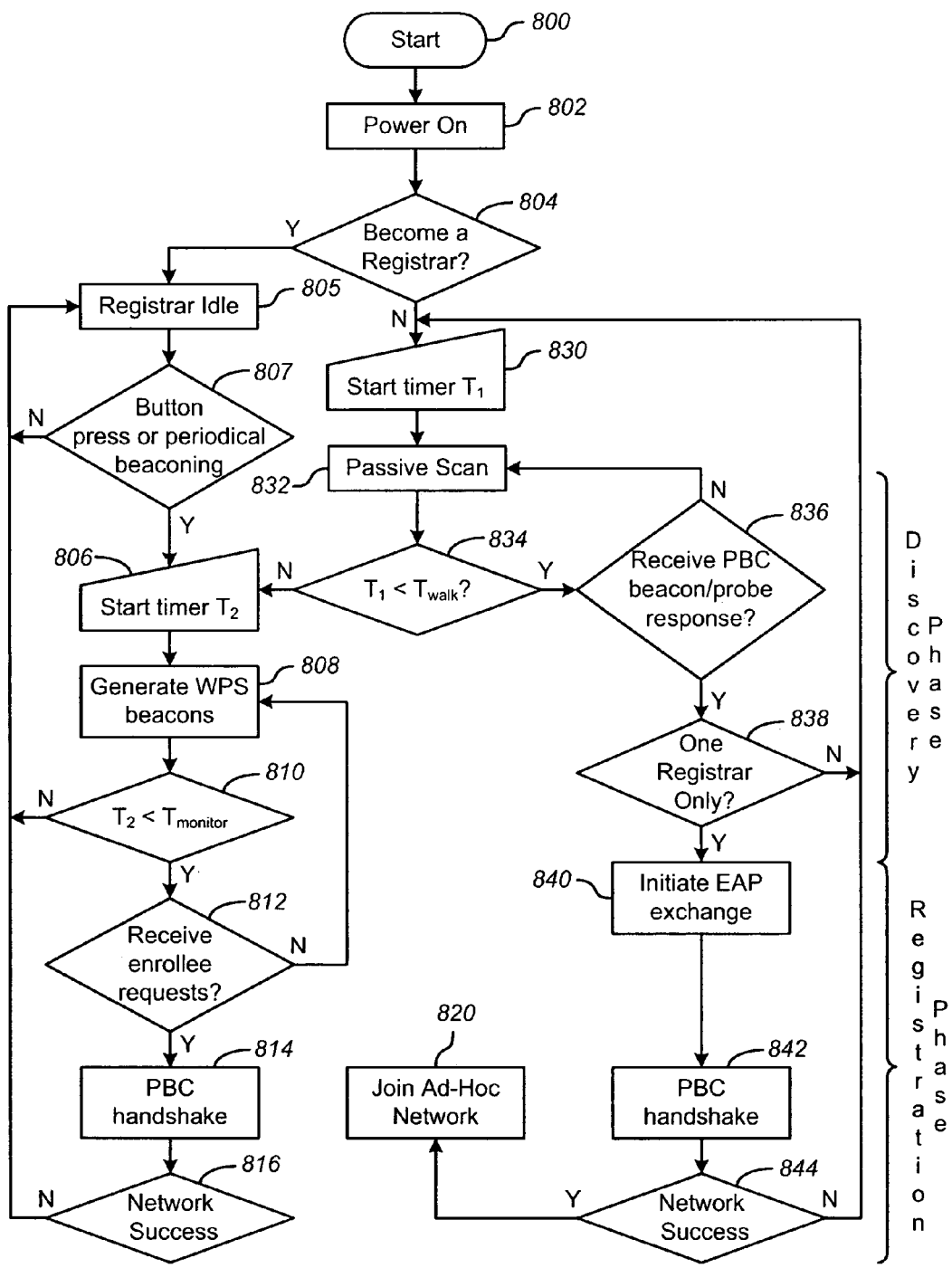
FIG. 8 is an exemplary flowchart of steps carried out to form an ad-hoc wireless network between a pair of devices, in accordance with one embodiment of the present invention.

FIG. 8 is an exemplary flowchart of steps carried out to form an ad-hoc Wi-Fi network between two devices, one of which will become a registrar and one an enrollee. The process starts at step 800 after which the devices are powered on (802). If a decision is made to configure the device as a registrar (804), the registrar enters idle mode 805. Next, in response to either user input, such as a user button press, or a periodic beaconing trigger (805), a timer $T_2$ is started (806) and the device starts to transmit beacons (808). A device configured as a registrar (804) remains in an idle mode 805 if the user does not press a button or the periodic beaconing is not triggered. While the timer's elapsed time is smaller than a predefined time $T_{monitor}$ (810), the registrar continues to look for probe requests (812) from an enrollee. If the registrar receives a probe request from an enrollee within period $T_{monitor}$, an attempt to form a push button configuration (PBC) handshake is made (814). If the handshake is made and ad-hoc network formation is successful (816), the registrar may establish communication over the established ad-hoc network. If the ad-hoc network formation is unsuccessful (816), the process moves back to step 804. If the registrar does not receive a probe request from an enrollee within the time period $T_{monitor}$, the process moves back to step 808. Once the timer $T_2$'s elapsed time becomes greater than $T_{monitor}$ (810), the process moves back to step 805. In one exemplary embodiment, the predefined time $T_{monitor}$ is 120 seconds.

If a decision is made not to configure the device as a registrar (804), the device becomes an enrollee and a timer $T_1$ is started (830). The enrollee starts to scan for a registrar (832). While the timer $T_1$'s time is smaller than a predefined time $T_{walk}$ (834), the enrollee continues to look for probe responses from a registrar (836). If the enrollee detects a probe response from a registrar (836), the enrollee checks to see whether other registrars are present (838). If the enrollee detects no registrar or more than one registrar, the process moves back to step 830. If the enrollee discovers no registrar or more than one registrar, the enrollee may make N more attempts, where N is a predefined integer, to discover the absence or presence of one or more registrars. If following the expiration of N attempts, the enrollee discovers no registrar or discovers more than one registrar, the enrollee may proceed with creating its own ad-hoc network and starting a registrar application. Only if the enrollee discovers a single registrar, does the enrollee proceed to register with the discovered registrar. If the enrollee detects a single registrar, it initiates an EAP exchange (840), and attempts to perform a PBC handshake (842). Thereafter, following a successful handshake and ad-hoc network formation (844), the enrollee may attempt to use the network credentials obtained from the registrar to join the network after registration. After an enrollee joins an ad-hoc network, if the enrollee is capable of serving as a registrar, the enrollee may attempt to establish its own network in conformity with which the enrollee periodically lowers its beacon contention window and attempts to add more enrollees. If the enrollee does not detect a probe response from a registrar within period $T_{walk}$, the enrollee starts its own registrar application to become a registrar (806).

Figure 9:
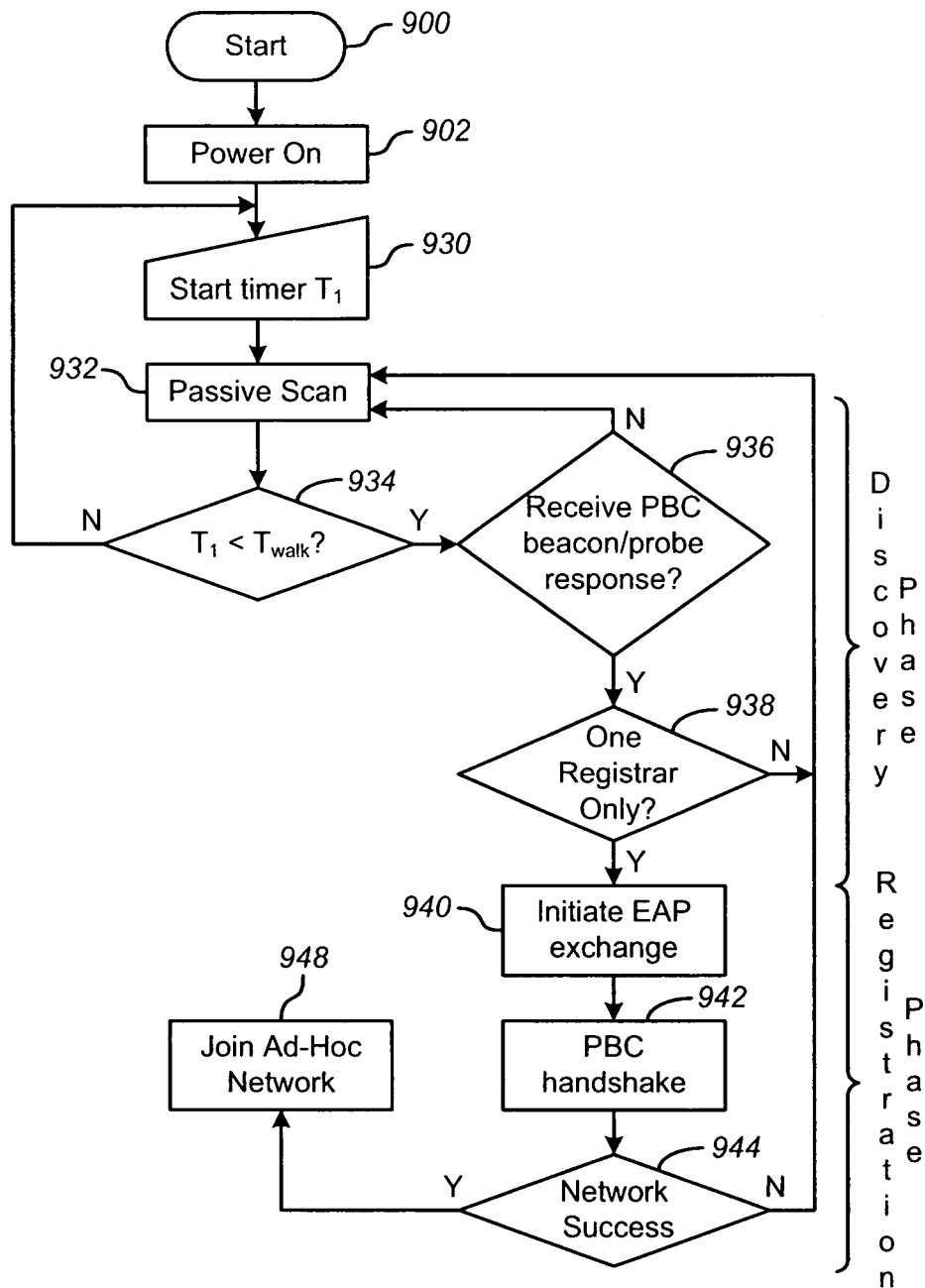
FIG. 9 is an exemplary flowchart of steps carried out by an enrollee to join an existing ad-hoc wireless network, in accordance with one embodiment of the present invention.

FIG. 9 is an exemplary flowchart of steps carried out by an enrollee to join an existing ad-hoc network. The process starts at step 900 following which the enrollee is powered on (902). After a timer $T_1$ is started (930), the enrollee starts to scan for a registrar (932). While the timer $T_1$'s elapsed time is smaller than a predefined time $T_{walk}$ (934), the enrollee continues to look for probe responses from a registrar (936). If the enrollee detects a probe response from a registrar (936), the enrollee checks to see whether other registrars are present (938). If the enrollee detects no registrar or more than one registrar, the process moves back to step 932. If the enrollee discovers no registrar or more than one registrar, the enrollee may make N more attempts, where N is a predefined integer, to discover the absence or presence of one or more registrars. If following the expiration of N attempts, the enrollee discovers no registrar or discovers more than one registrar, the enrollee may proceed with creating its own ad-hoc network and starting a registrar application. Only if the enrollee discovers a single registrar, does the enrollee proceed to register with the discovered registrar. If the enrollee detects a single registrar, it initiates an EAP exchange (940), and attempts to perform a PBC handshake (942). Thereafter, following a successful handshake and ad-hoc network formation (944), the enrollee may attempt to use the network credentials obtained from the registrar to join the network after registration. After an enrollee joins an ad-hoc network, if the enrollee is capable of serving as a registrar, the enrollee may attempt to establish its own network in conformity with which the enrollee periodically lowers its beacon contention window and attempts to add more enrollees.

Figure 10:
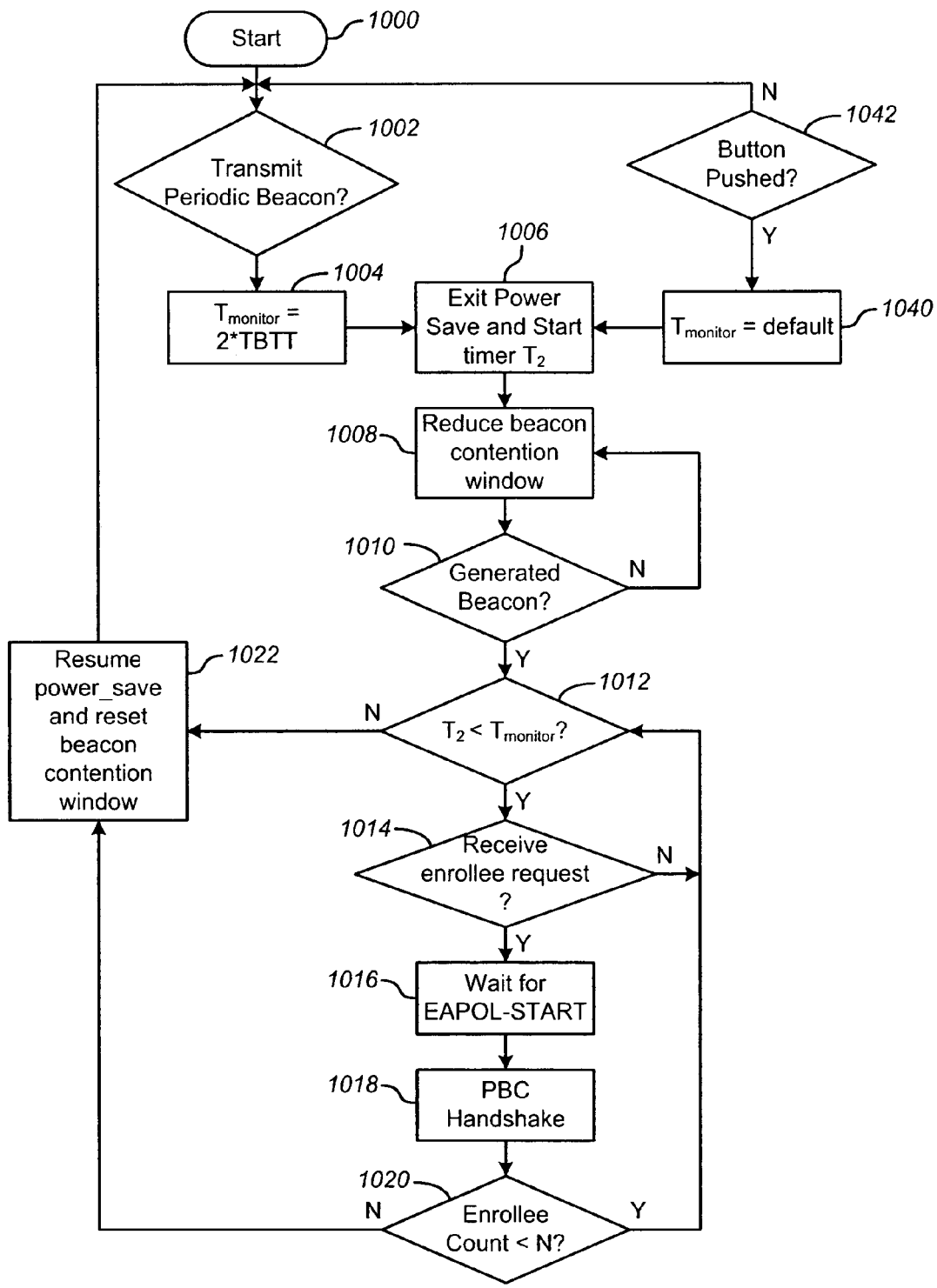
FIG. 10 is an exemplary flowchart showing the steps taken by a registrar to enter into an aggressive beaconing mode so as to be discovered by an enrollee, in accordance with one embodiment of the present invention.

As described above, in an ad-hoc network, battery consumption is generally a major design factor. Accordingly, each registrar is periodically placed in the power-save mode to save battery consumption. FIG. 10 is an exemplary flowchart showing the steps taken by a registrar to enter into an aggressive beaconing mode so as to be discovered by an enrollee. Following the start of the process at step 1000, a determination is made as to whether it is time for the registrar to generate beacons (1002). If it is determined that the registrar is required to generate beacons (1002), parameter $T_{monitor}$ is set to twice the value of TBTT. Next, the registrar exits the power save mode, starts a second timer $T_2$ (1006), and reduces its beacon contention window (1008). While in an aggressive beaconing mode, i.e., reduced beacon contention window mode, the registrar listens for beacons from other registrars. So long as the registrar detects beacons from other registrars (1010), the registrar does not generate its own beacons, and continues to reduce its beacon contention window (1008). However, if the registrar does not detect beacons from other registrars, it generates its own beacons using its last beacon contention window (1010). Following beacon generation, if timer $T_2$'s time is determined as being greater than $T_{monitor}$ (1012), the registrar resumes the power-save mode and resets its beacon contention window to its starting value (1022). While timer $T_2$'s time is determined as being smaller than $T_{monitor}$ (1012), the registrar continues to look for probe requests from an enrollee (1014). If the registrar detects an enrollee probe request, it waits for an EAPOL_START frame (1016) and performs a handshake (1018). Next, if the registrar determines that a count of the registered enrollees is less than a predetermined count N, the process moves to step 1012 to register more enrollees. If, on the other hand, the registrar determines that all N enrollees have been registered, the registrar resumes the power-save mode and resets its beacon contention window to its starting value (1022).

Figure 11:
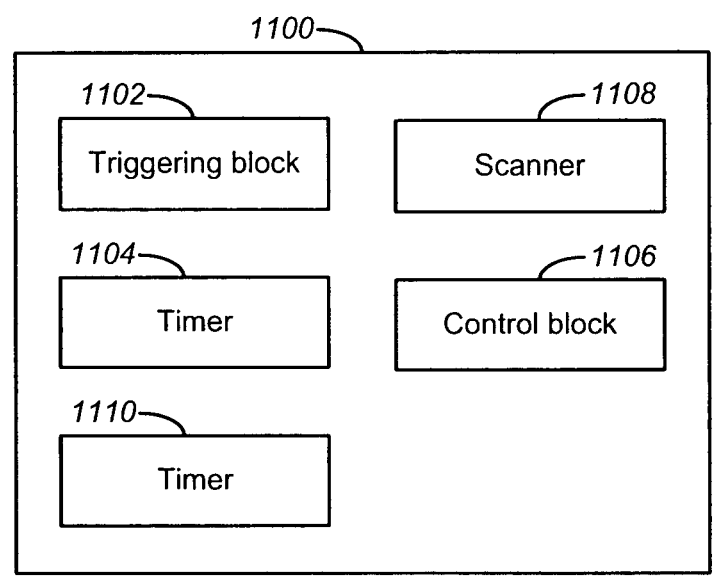
FIG. 11 shows various blocks of a device adapted to be configured as an enrollee and/or a registrar, in accordance with one embodiment of the present invention.

FIG. 11 shows a block diagram of a device 1100 adapted to be configured as an enrollee and/or a registrar, in accordance with one embodiment of the present invention. Device 1100 is shown as including, in part, a triggering block 1102, timers 1104, 1110, a control block 1106 and a scanner 1108. Triggering block 1102 is configured to trigger an event in response to a user action. For example, when device 1100 is powered on, triggering block 1102 starts first timer 1104. Control block 1106 configures device 1100 as an enrollee if triggering block 1102 detects a second user action before timer 1104's elapsed time reaches a predefined time. Control block 1106 configures device 1100 as a registrar if triggering block 1102 does not detect a second user action when timer 1104's elapsed time reaches the predefined time. Control block 1106 also modifies the beacon contention window of device 1100. Scanner 1108 scans for beacons transmitted by the registrars if device 1100 is configured as an enrollee. Timer 1110 is used to determine whether probe requests are received within a given time period if device 1100 is configured as a registrar. Timer 1110 is also used to determine whether probe responses are received within a given time period if device 1100 is configured as an enrollee.

Each of the blocks described above can be implemented using circuitry. As used herein, the term "circuitry" refers to a pure hardware implementation and/or a combined hardware/software (or firmware) implementation. Accordingly, "circuitry" can take the form of one or more of an application specific integrated circuit (ASIC), a programmable logic controller, a programmable logic array, an embedded microcontroller, and a single-board computer, as well as a processor or a microprocessor and a computer-readable medium that stores computer-readable program code (e.g., software or firmware) executable by the processor or the microprocessor. Also, the "circuitry" can be one or more than one component, as the functionality of the "circuitry" can be distributed among several components in the system.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method of forming an ad-hoc wireless local area network, the method comprising:
    receiving a first user input on a device initiated by a user;
    in response to receiving the first user input, entering a configuration mode on the device for configuring the device as one of an enrollee and a registrar in the ad-hoc wireless local area network;
    receiving a second user input on the device initiated by the user for configuring the device as one of the enrollee and the registrar in the ad-hoc wireless local area network;
    configuring the device as one of the enrollee and the registrar in response to the device receiving the second user input; and
    enabling communications between the device and a second device in the ad-hoc wireless network,
    wherein configuring the device as one of the enrollee and the registrar comprises:
        configuring the device as one of the enrollee and the registrar if the second user input is received by the device within a first predefined time of the first user input; and
        configuring the device as the other of the enrollee and the registrar if the second user input is not received by the device within the first predefined time of the first user input.

2. The method of claim 1 wherein enabling communication between the device and the second device comprises:
    setting a beacon contention window of the device to a value between 0 and 15 time slots if the device is configured as the registrar; and
    transmitting beacons in accordance with the set beacon contention window.

3. The method of claim 2 further comprising:
    starting a timer;
    initiating an attempt to perform a registrar-enrollee handshake if a probe request transmitted by the second device is received by the registrar before the timer's elapsed time reaches a predefined time, where the second device is configured as the enrollee; and
    establishing the ad-hoc network between the registrar and the enrollee if the attempt is successful.

4. The method of claim 3 further comprising:
    adding N more enrollees to the established ad-hoc network wherein N is a predefined integer greater than 1.

5. The method of claim 3 further comprising:
    placing the registrar in an idle mode if the registrar fails to receive an enrollee probe request before the timer's elapsed time reaches the second predefined time.

6. The method of claim 5 further comprising:
    causing the registrar to exit the idle mode periodically in accordance with a first clock period.

7. The method of claim 6 further comprising:
    setting a scanning period of equal to the first clock period.

8. The method of claim 5 further comprising:
    causing the registrar to exit the idle mode in response to the second user input.

9. The method of claim 2 further comprising:
    reducing the beacon contention window while the registrar receives beacons from other registrars forming an ad-hoc network with the registrar.

10. The method of claim 2 further comprising:
    receiving a PIN on the registrar, the PIN being associated with the enrollee seeking to communicate with the registrar.

11. The method of claim 10 wherein the PIN is received via an optical signal.

12. The method of claim 10 wherein the PIN is received via an audio signal.

13. The method of claim 10 wherein the PIN is entered manually by the user.

14. The method of claim 1 further comprising:
    starting a timer if the device is configured as the enrollee;
    scanning for beacons transmitted by the second device, where the second device is configured as the registrar; and
    initiating an extended authentication protocol exchange if the enrollee receives a beacon from the registrar before the timer's elapsed time reaches a second predefined time.

15. The method of claim 14 further comprising:
    initiating an attempt to perform a registrar-enrollee handshake after the completion of the exchange of the extended authentication protocol; and
    establishing the ad-hoc network if the attempt is successful.

16. The method of claim 15 further comprising:
    resetting the timer if the attempt is unsuccessful.

17. The method of claim 15 further comprising:
starting a registrar application on the enrollee after the ad-hoc network is established.

18. The method of claim 1 further comprising:
setting a beacon contention window of the device to a value between 0 and 10 time slots if the device is configured as the registrar; and
transmitting beacons in accordance with the set beacon contention window.

19. The method of claim 1 further comprising:
setting a beacon contention window of the device to a value between 0 and 5 time slots if the device is configured as the registrar; and
transmitting beacons in accordance with the set beacon contention window.

20. The method of claim 1 wherein the first user input corresponds to a pressing of a button.

21. The method of claim 1 wherein the first user input corresponds to an issuing of a voice command.

22. The method of forming an ad-hoc wireless network of claim 1, further comprising:
configuring the second device as the other of the enrollee and the registrar based on the second user input.

23. A method of selecting a configuration of a device attempting to participate in an ad-hoc wireless local area network session, the method comprising:
receiving a first user input on the device;
in response to receiving the first user input on the device, presenting an option to a user to configure the device as one of a registrar and an enrollee in the ad-hoc wireless local area network session;
receiving a second user input on the device for configuring the device as one of the registrar and the enrollee in the ad-hoc wireless local area network; and
configuring the device as one of the registrar and the enrollee in response to the device receiving the second user input;
wherein configuring the device as one of the enrollee and the registrar comprises:
configuring the device as one of the enrollee and the registrar if the second user input is received by the device within a first predefined time of the first user input; and
configuring the device as the other of the enrollee and the registrar if the second user input is not received by the device within the first predefined time of the first user input.

24. The method of selecting a configuration of a device attempting to participate in an ad-hoc network session of claim 23, wherein configuring the device as one of the registrar and the enrollee based on the second user input comprises:
configuring the device as one of the registrar and the enrollee if a first option is selected; and
configuring the device as the other of the registrar and the enrollee if a second option is selected.

25. A device configured to participate in an ad-hoc wireless local area network, the device comprising:
an interface configured to receive a first user input initiated by a user on the device and a second user input initiated by the user on the device, the second user input for configuring the device as one of an enrollee and a registrar in the wireless ad-hoc network; and
a controller configured to:
enter a configuration mode on the device for configuring the device as one of an enrollee and a registrar in response to the first user input,
detect the second user input; and
configure the device as one of the enrollee and the registrar in response to detecting the second user input; and a timer;
wherein the controller is operative to configure the device as one of the enrollee and the registrar if the controller detects the second user input before a time set on the timer reaches a known time, the controller further operative to configure the device as the other of the enrollee and the registrar if the controller does not detect the second user input before the time set on the first timer time reaches the known time.

26. The device of claim 25 wherein the controller is further operative to set a beacon contention window of the device to a value between 0 and 15 time slots if the device is configured as the registrar, the device to transmit beacons in accordance with the set beacon contention window.

27. The device of claim 26, wherein the timer comprises a first timer, the device further comprising:
a second timer, the controller being further operative to perform a registrar-enrollee handshake if a probe request transmitted by the enrollee is received before the second timer's elapsed time reaches a predefined time, the device being operative to establish an ad-hoc network if the handshake is successful.

28. The device of claim 27 wherein the controller is operative to reset the second timer if the handshake is unsuccessful.

29. The device of claim 27 wherein the controller is further operative to place the registrar in an idle mode if the registrar fails to receive an enrollee probe request before the second timer's time reaches the predefined time.

30. The device of claim 29 wherein the controller is further operative to cause the registrar to exit the idle mode periodically in accordance with a first clock period.

31. The device of claim 29 wherein the controller is further operative to cause the registrar to exit the idle mode in response to the second user input.

32. The device of claim 26 wherein the controller is further operative to reduce the beacon contention window while the registrar receives beacons from other registrars forming the ad-hoc network with the registrar.

33. The device of claim 26 wherein the registrar is further configured to receive a PIN associated with the enrollee.

34. The device of claim 33 where the interface module comprises a user interface configured to receive the PIN via a manual entry by the user.

35. The device of claim 25 wherein the device is configured as the enrollee; wherein the timer comprises a first timer, the enrollee further comprising:
a second timer; and
a scanner configured to scan for beacons transmitted by one or more registrars;
wherein the controller is further operative to initiate an extended authentication protocol exchange if the enrollee receives a beacon from the one or more registrars before the second timer's elapsed time reaches a predefined time.

36. The device of claim 35 wherein the controller is further operative to attempt to perform a registrar-enrollee handshake after the completion of the exchange of the extended authentication protocol; the controller being further operative to establish an ad-hoc network if the attempt is successful.

37. The device of claim 36 wherein the controller is operative to reset the timer if the attempt is unsuccessful.

38. The device of claim 36 wherein the controller is further operative to place the enrollee in an idle mode.

39. The device of claim 36 wherein the controller is further operative to start a registrar application on the enrollee after the ad-hoc network is established.

40. The device of claim 25 wherein the controller is further configured to set a beacon contention window of the device to a value between 0 and 10 time slots if the device is configured as the registrar, the device being configured to transmit beacons in accordance with the set beacon contention window.

41. The device of claim 25 wherein the controller is further configured to set a beacon contention window of the device to a value between 0 and 5 time slots if the device is configured as the registrar, the device to transmit beacons in accordance with the set beacon contention window.

42. The device of claim 25 further comprising a button in communication with the interface and configured to receive the first user input.

43. The device of claim 25 further comprising an audio interface in communication with the interface and configured to receive a voice command representing the first user input.

44. A method of forming a wireless ad-hoc network between a first device and a second device, the method comprising:
  turning on the first device;
  turning on the second device;
  starting a first timer on the first device;
  starting a second timer on the second device;
  pressing a button on the first device before the first timer's elapsed time reaches a predefined time in order to configure the first device as an enrollee;
  avoiding a button press on the second device before the second timer's elapsed time reaches the predefined time in order to configure the second device as a registrar;
  reducing a beacon contention window of the second device;
  transmitting beacons from the second device in accordance with the reduced beacon contention window;
  intercepting the transmitted beacons via the first device thereby enabling the first device to discover the second device;
  performing a handshake operation between the first and second devices; and
  forming the ad-hoc network.

* * * * *